(12) United States Patent
Schroder et al.

(10) Patent No.: US 11,163,055 B2
(45) Date of Patent: Nov. 2, 2021

(54) TIME AND FREQUENCY SYNCHRONIZATION FOR SPREAD RADAR SYSTEMS

(71) Applicant: IEE INTERNATIONAL ELECTRONICS & ENGINEERING S.A., Echternach (LU)

(72) Inventors: Udo Schroder, Föhren (DE); Hans-Peter Beise, Perl (DE); Thomas Stifter, Trier (DE)

(73) Assignee: IEE INTERNATIONAL ELECTRONICS & ENGINEERING S.A., Echternach (LU)

( * ) Notice: Subject to any disclaimer, the term of this patent is extended or adjusted under 35 U.S.C. 154(b) by 288 days.

(21) Appl. No.: 16/472,756

(22) PCT Filed: Dec. 21, 2017

(86) PCT No.: PCT/EP2017/084246
§ 371 (c)(1),
(2) Date: Jun. 21, 2019

(87) PCT Pub. No.: WO2018/115370
PCT Pub. Date: Jun. 28, 2018

(65) Prior Publication Data
US 2019/0317207 A1    Oct. 17, 2019

(30) Foreign Application Priority Data

Dec. 23, 2016 (LU) .................................... 93 395
Feb. 20, 2017 (LU) .................................... 100 106

(51) Int. Cl.
*G01S 13/87* (2006.01)
*G01S 7/02* (2006.01)
(Continued)

(52) U.S. Cl.
CPC ............ *G01S 13/878* (2013.01); *G01S 7/023* (2013.01); *G01S 7/4004* (2013.01);
(Continued)

(58) Field of Classification Search
CPC ....... G01S 13/878; G01S 7/023; G01S 7/4004
See application file for complete search history.

(56) References Cited

U.S. PATENT DOCUMENTS 10,627,483 B2 * 4/2020 Rao .................... G01S 7/354
2006/0220946 A1 10/2006 Nohmi
(Continued)

FOREIGN PATENT DOCUMENTS

| DE | 102015110619 A1 | 1/2016 |
| EP | 2916140 A2 | 9/2015 |
| EP | 3021132 A1 | 5/2016 |

OTHER PUBLICATIONS

International Search Report corresponding to International application No. PCT/EP2017/084246, dated Mar. 7, 2018, 4 pages.
(Continued)

*Primary Examiner* — Marcus E Windrich
(74) *Attorney, Agent, or Firm* — Reising Ethington P.C.

(57) ABSTRACT

An automotive spread MIMO-configured radar system has a plurality of transceiver antenna units for transmitting mutually orthogonal radar waves. Each transceiver antenna unit has a plurality of range gates to indicate a range detected by the transceiver antenna unit. At least one specific transceiver antenna unit ($TRx_1$) is configured to transmit a reference signal received directly by at least one transceiver antenna unit ($TRx_2$) that is separated by an a priori known distance from the specific transceiver antenna unit ($TRx_1$). An evaluation and control unit is configured for reading out the plurality of range gates for the transceiver antenna unit ($TRx_2$), and, based on the read-out range gate that indicates the received reference signal and based on the a priori known distance, for synchronizing the specific transceiver antenna unit ($TRx_1$) and the transceiver antenna unit ($TRx_2$) that received the reference signal and/or for correcting a measured Doppler shift.

11 Claims, 4 Drawing Sheets

(51) Int. Cl.
*G01S 7/40* (2006.01)
*G01S 13/32* (2006.01)
*G01S 13/34* (2006.01)
*G01S 13/931* (2020.01)
*H04B 7/0413* (2017.01)

(52) U.S. Cl.
CPC ............ *G01S 13/325* (2013.01); *G01S 13/34* (2013.01); *G01S 13/931* (2013.01); *H04B 7/0413* (2013.01); *G01S 2013/9322* (2020.01); *G01S 2013/93271* (2020.01)

(56) References Cited

U.S. PATENT DOCUMENTS

| | | | |
|---|---|---|---|
| 2015/0253419 A1* | 9/2015 | Alland | G01S 13/4463 342/385 |
| 2016/0131752 A1* | 5/2016 | Jansen | G01S 13/343 342/27 |
| 2016/0285172 A1* | 9/2016 | Kishigami | G01S 13/22 |
| 2017/0082730 A1* | 3/2017 | Kishigami | H01Q 21/061 |
| 2018/0074191 A1 | 3/2018 | Bilik et al. | |

OTHER PUBLICATIONS

Written Opinion corresponding to International application No. PCT/EP2017/084246, dated Mar. 7, 2018, 6 pages.

N. Levanon et al, "Comparison Between Linear FM and Phase-Coded CW Radars", IEE Proc.—Radar, Sonar Navig., vol. 141, No. 4, Aug. 1994, pp. 230-240.

D.A. Bell, "Walsh Functions and Hadamard Matrixes", Electronics Letters, vol. 2, No. 9, Sep. 1966, p. 340.

Y. Yang et al, "Some Phase Synchronization Algorithms for Coherent MIMO Radar", ECE Department, Lehigh University, 2011, 6 pages.

N. Zhang et al, "Identifiability Analysis for Array Shape Self-Calibration in MIMO Radar", Department of Electronic Engineering, Tsinghua University, 2014, pp. 1108-1113.

* cited by examiner

TIME AND FREQUENCY SYNCHRONIZATION FOR SPREAD RADAR SYSTEMS

TECHNICAL FIELD

The invention relates to an automotive spread multiple-input multiple-output configured radar system for detection of targets, and/or for measuring relative velocity of detected targets and/or for measuring an angle of arrival of a radar signal reflected by a target, to a method of operating such automotive spread multiple-input multiple-output configured radar system, and to a software module for controlling automatic execution of steps of such method.

BACKGROUND OF THE INVENTION

It is known in the art to employ radar technology, in particular in the millimeter wave range between 75 and 81 GHz, in exterior automotive applications such as driver assistance systems for providing improved safety by facilitating an optimized reaction of a driver of a vehicle with appropriate warnings or even by automatically taking over control of the vehicle, for instance in collision avoidance systems.

It is further known to employ a multiple-input multiple-output (MIMO) radar configuration for increasing an accuracy of an angle of arrival measurement. In a MIMO radar configuration, a virtual array is formed by transmit antennas and receive antennas.

By way of example, patent application EP 3021132 A1 describes a MIMO radar system for automotive application. The MIMO radar system is used to detect reflecting objects in its field of view, to unambiguously measure the distance to each of the detected objects, to unambiguously measure the relative radial velocity of each of the detected objects, and to measure, with high resolution, the angle of arrival of the reflected radar signal of each of the detected objects.

The MIMO radar system described in document EP 3021132 A1 relates to a method for detecting an object using a radar system having M transmit antennas, N receive antennas, and a processor, including: receiving, by the processor, N×M digital signals, wherein the N receivers receive M received signals corresponding to M sequences of encoded transmitted signals resulting in N×M digital signals; processing the N×M digital signals to produce N×M first range/relative velocity matrices; applying a phase compensation to N×(M−1) first range/relative velocity matrices to compensate for a difference in range between the N×(M−1) first range/relative velocity matrices and the Mth range/velocity matrix; decoding the M phase compensated range/relative velocity matrices for the N receivers using an inverse of the transmit encoding to produce M decoded phase range/relative velocity matrices for the N receivers; detecting objects using the M range/relative velocity matrices for the N receivers to produce a detection vector.

Mutual distances between the M transmit antennas and N receive antennas are in the order of wavelength at the radar carrier frequency.

A displacement of the antennas by multiple wavelengths leads to ambiguity in angular reconstruction. In order to use the described angle of arrival estimation method it is therefore mandatory to ensure a synchronization of the antennas on the scale of a period of the radar carrier frequency, which in case of an exemplary radar carrier frequency of 100 GHz means a synchronization on the scale of picoseconds ($10^{-12}$ s).

European patent application EP 2916140 A2 describes a multiple-input multiple-output (MIMO) antenna for a radar system for automotive application with improved grating lobe performance of the antenna. The MIMO antenna includes a first transmit antenna, a second transmit antenna, and a receive antenna. The first transmit antenna is configured to emit a first radar signal toward a target. The first transmit antenna is formed of a first vertical array of radiator elements. The second transmit antenna is configured to emit a second radar signal toward the target. The second transmit antenna is formed of a second vertical array of radiator elements distinct from the first vertical array. The receive antenna is configured to detect radar signals reflected by a target toward the receive antenna. The receive antenna is formed of a plurality of paired vertical arrays of detector elements.

The MIMO antenna includes spacing of multiple transmit and receive antennas in the horizontal dimension which simultaneously provides for higher gain antennas with half wavelength spacing of the virtual synthetic array to avoid grating lobes. To avoid grating lobes, the vertical arrays that form the TX and RX antennas are typically required to be spaced by half wavelength. A phase offset between virtual phase centers of the sub-arrays is corrected prior to digital beam-forming in azimuth in order to eliminate grating lobes altogether.

Again, in order to use the described MIMO radar it is mandatory to ensure a synchronization of the antennas on the scale of a period of the radar carrier frequency.

However, future demands are directed towards multiple small antennas mounted spread over a vehicle for providing multi-functionalities (compare FIG. 1).

In such systems with multiple antennas spread out over the face of a car, wherein a distance between the antennas is large compared to the radar carrier wavelength, a synchronization of the antennas on the scale of a period of the radar carrier frequency represents an issue because the standard CAN-bus from the 1980's is capable of ensuring a latency only up to 120 µs for high priority messages.

SUMMARY

It is therefore an object of the invention to provide a method and a radar system that is capable of at least one of
    detecting reflecting targets in its field of view,
    unambiguously measuring a distance to each of the detected targets,
    unambiguously measuring a relative radial velocity of each of the detected targets, and
    measuring an angle of arrival of the reflected radar signal of each of the detected targets
without a need of ensuring a synchronization of antennas on the scale of a radar carrier frequency.

In one aspect of the present invention, the object is achieved by an automotive spread multiple-input multiple-output (MIMO) configured radar system. The MIMO radar system comprises a plurality of transceiver antenna units that are configured to transmit mutually orthogonal radar wave signals. For each transceiver antenna unit of the plurality of transceiver antenna units, the MIMO radar system includes a plurality of range gates that is configured to indicate a range detected by the transceiver antenna unit. At least one specific transceiver antenna unit of the plurality of transceiver antenna units is configured to transmit, synchronized with the radar wave, a reference signal that is to be received directly by at least one transceiver antenna unit that is separated by an a priori known distance from the specific transceiver antenna unit. The a priori known distance is substantially larger than a radar carrier wavelength.

Moreover, the MIMO radar system includes an evaluation and control unit that is configured for reading out the plurality of range gates for the transceiver antenna unit that received the reference signal. Then, based on the read-out range gate of the plurality of range gates that indicates the received reference signal and based on the a priori known distance, the evaluation and control unit is configured for synchronizing the specific transceiver antenna unit and the transceiver antenna unit that received the reference signal.

The term "automotive", as used in this application, shall particularly be understood to encompass an application for a vehicle such as, but not limited to, passenger cars, trucks and buses.

The phrase "MIMO configured radar system", as used in this application, shall particularly be understood as a radar system wherein each transceiver antenna unit is understood to be able to transmit radar waves in an independent manner that represent mutually orthogonal codes. The orthogonality can be implemented in frequency-modulated continuous wave (FMCW) radars via a modulation of ramp length, bandwidth, phase center motion or time-shifts. In phase-modulated continuous wave (PMCW) radars, the coding is adapted via a sequence of binary symbols or more generally N-phase or polyphase symbols. Each transceiver antenna unit is further understood to be able to receive radar waves that have been transmitted by itself and any of the other transceiver antenna units and that have been reflected by a target without any cross talk disturbance. The advantages and drawbacks of FMCW and PMCW radar systems are, for instance, discussed in Levanon, N., and B. Getz: "*Comparison between linear FM and phase-coded CW radars*", IEE Proceedings-Radar, Sonar and Navigation 141.4 (1994), 230-240. The benefits of MIMO configured radar systems regard enlarged size of virtual aperture, improved spatial resolution and less sensitivity to interference signals, as is well known in the art.

As is known in the art, the range discrimination of a radar system is usually regulated by the so-called range gates. This means that the received echo signal is sampled at given time-slots, and each of these points in time corresponds to a range gate in distance.

The term "substantially larger", as used in this application, shall particularly be understood as being larger by a factor of at least five, more preferable by a factor of at least ten, and, most preferable, by a factor of at least 20.

The phrase "onfigured to", as used in this application, shall in particular be understood as being specifically programmed, laid out, furnished or arranged.

Advantageously, it has been discovered that a reference signal can be used for synchronization that is received directly from the specific transceiver antenna unit and that can be identified based on the direct path from the transmitting transceiver antenna unit to the receiving transceiver antenna unit. Because the distance between the transceiver antenna units is a priori known it is possible to measure and to correct for the time shift for synchronization purposes. Any detour of the transmitted reference signal via a target will result in a larger time shift, will occur in a later range gate and can thereby be excluded.

It is emphasized that the information obtained from the received reference signal is solely range-based, and not phase-based, and therefore does not require any synchronization on the scale of a radar carrier frequency.

Preferably, the reference signal can be transmitted by a side lobe of the transmitting transceiver antenna unit. This is particularly suitable in arrangements wherein the plurality of transceiver antenna units is arranged with lateral offsets between the transceiver antenna units. In this way, a field of view provided by the main lobes of the transceiver antenna units is not affected by any one of the other transceiver antenna units.

In preferred embodiments of the automotive spread radar system, the at least one specific transceiver antenna unit of the plurality of transceiver antenna units is configured to transmit the reference signal with a predetermined time delay relative to the transmitted radar wave, wherein the predetermined time delay is larger than zero.

In this way, an ambiguity arising from the transmitted reference signal being sent out too early to be detected in one of the first range gates of the receiving transceiver antenna unit can be avoided for a larger range of time, thus making the time synchronization more robust. An appropriate value for the predetermined time delay can be chosen depending on an intended application of the radar system.

In preferred embodiments, the automotive spread radar system comprises means for determining a carrier frequency of the specific transceiver antenna unit from a signal of the transceiver antenna unit that received the reference signal, and the evaluation and control unit is configured for correcting, based on the determined carrier frequency, a Doppler shift measured at a target by the specific transceiver antenna unit.

This is based on the insight that a difference between the radar carrier wave frequency of the specific transceiver antenna unit and the radar carrier wave frequency of the transceiver antenna unit that received the reference signal, which for instance may be represented by a frequency difference between local oscillators of the transceiver antenna units, results in a measured Doppler shift. By ensuring that the reference signal is directly sent from the specific transceiver antenna unit to the receiving transceiver antenna unit as described above, a Doppler shift caused by a reflecting target can be ruled out. The measured frequency difference can be corrected by comparison with an expected Doppler shift, which in the case of the specific transceiver antenna unit and the receiving transceiver antenna unit being in a state of relative rest would be zero. However, the measured frequency difference but may be different from zero, for instance during specific driving conditions of a vehicle.

In preferred embodiments of the automotive spread radar system, the transceiver antenna units of the plurality of transceiver antenna units are located at a priori known positions at the surrounding of a vehicle, e.g. at a front region of a vehicle or laterally on the vehicle or even in the rear part of the vehicle. In this way, the automotive spread radar system can beneficially be employed to provide information that can be used in driver assistance systems such as collision warning systems and lane change assistance systems.

Preferably, the evaluation and control unit comprises a processor unit and a non-transitory computer-readable medium (digital data memory unit) to which the processor unit has data access. In this way, the time synchronization and a correction of the measured frequency difference can be performed within the automotive spread radar system to ensure a fast and undisturbed signal processing and evaluation.

In preferred embodiments, the automotive spread radar system further comprises modulation means to operate the plurality of transceiver antenna units in a phase-modulated continuous wave (PMCW) mode. Using PMCW as a modulation technique can facilitate providing orthogonal waveforms to transmitting antennas of the transceiver antenna units by enabling the use of binary symbols or more generally of N-phase or polyphase symbols.

In another aspect of the invention, a method of operating an automotive spread multiple-input multiple-output (MIMO) configured radar system is provided, wherein the MIMO-configured radar system comprises a plurality of transceiver antenna units that are configured to transmit mutually orthogonal radar signals, and further includes for each transceiver antenna unit of the plurality of transceiver antenna units a plurality of range gates for indicating a range detected by the transceiver antenna unit.

The method comprises steps of
transmitting modulated, mutually orthogonal radar waves by the plurality of transceiver antenna units in a continuous-wave manner,
by at least one specific transceiver antenna unit of the plurality of transceiver antenna units, directly transmitting a reference signal that is synchronized with the radar wave transmitted by the at least one specific transceiver antenna unit, to at least one transceiver antenna unit that is separated by an a priori known distance from the specific transceiver antenna unit,
reading out the plurality of range gates for the at least one transceiver antenna unit that received the reference signal, and
based on the read-out range gate of the plurality of range gates that indicates the received reference signal and the a priori known distance, synchronizing the specific transceiver antenna unit and the transceiver antenna unit that received the reference signal.

As disclosed in context with the automotive spread MIMO radar system, the reference signal that is received directly from the specific transceiver antenna unit and that can be identified based on the direct path from the transmitting transceiver antenna unit to the receiving transceiver antenna unit can be used for synchronization. Because the distance between the transceiver antenna units is a priori known it is possible to measure and to correct for the time shift for synchronization purposes. Any detour of the transmitted reference signal via a target will result in a larger time shift, will occur in a later range gate and can thereby be excluded.

In preferred embodiments of the method, the step of directly transmitting a reference signal that is synchronized with the radar wave comprises transmitting the reference signal with a predetermined time delay relative to the transmitted radar wave, wherein the predetermined time delay is larger than zero. In this way, an ambiguity arising from the transmitted reference signal being sent out too early to be detected in one of the first range gates of the receiving transceiver antenna unit can be avoided for a larger range of time, thus making the time synchronization more robust.

An appropriate value for the predetermined time delay can be chosen depending on an intended application of the radar system.

In some preferred embodiments, the method further comprises steps of
determining a carrier frequency of the specific transceiver antenna unit from a signal of the transceiver antenna unit that received the reference signal, and
based on the determined carrier frequency, correcting a Doppler shift measured at a target by the specific transceiver antenna unit.

By ensuring that the reference signal is directly sent from the specific transceiver antenna unit to the receiving transceiver antenna unit as described above, a Doppler shift caused by a reflecting target can be ruled out, and the measured frequency difference can be corrected by comparison with an expected Doppler shift, which in the case of the specific transceiver antenna unit and the receiving transceiver antenna unit being in a state of relative rest would be zero.

Preferably, the steps of the method are repeated for pairs of transceiver antenna units out of the plurality of transceiver antenna units such that each transceiver antenna unit has directly transmitted a reference signal to at least one other transceiver antenna unit and has directly received a reference signal from at least one other transceiver antenna unit. In this way, it can be enabled to measure and to correct for mutual time shifts among the plurality of transceiver antenna units for synchronization purposes and/or to correct a Doppler shift measured by any one of the specific transceiver antenna units.

In yet another aspect of the invention, a software module for controlling automatic execution of steps of an embodiment of the method disclosed herein is provided.

The method steps to be conducted are converted into a program code of the software module, wherein the program code is implementable in a digital memory unit of the automotive spread radar system; that is, it is stored on the computer-readable medium and is executable by a processor unit of the automotive spread radar system. Preferably, the digital memory unit and/or processor unit may be a digital memory unit and/or a processing unit of the evaluation unit of the automotive spread radar system. The processor unit may, alternatively or supplementary, be another processor unit that is especially assigned to execute at least some of the method steps.

The software module can enable a robust and reliable execution of the method and can allow for a fast modification of method steps if appropriate.

It shall be pointed out that the features and measures detailed individually in the preceding description can be combined with one another in any technically meaningful manner and show further embodiments of the invention. The description characterizes and specifies the invention in particular in connection with the figures.

These and other aspects of the invention will be apparent from and elucidated with reference to the embodiments described hereinafter.

DESCRIPTION OF THE ILLUSTRATED EMBODIMENTS

Figure 1:
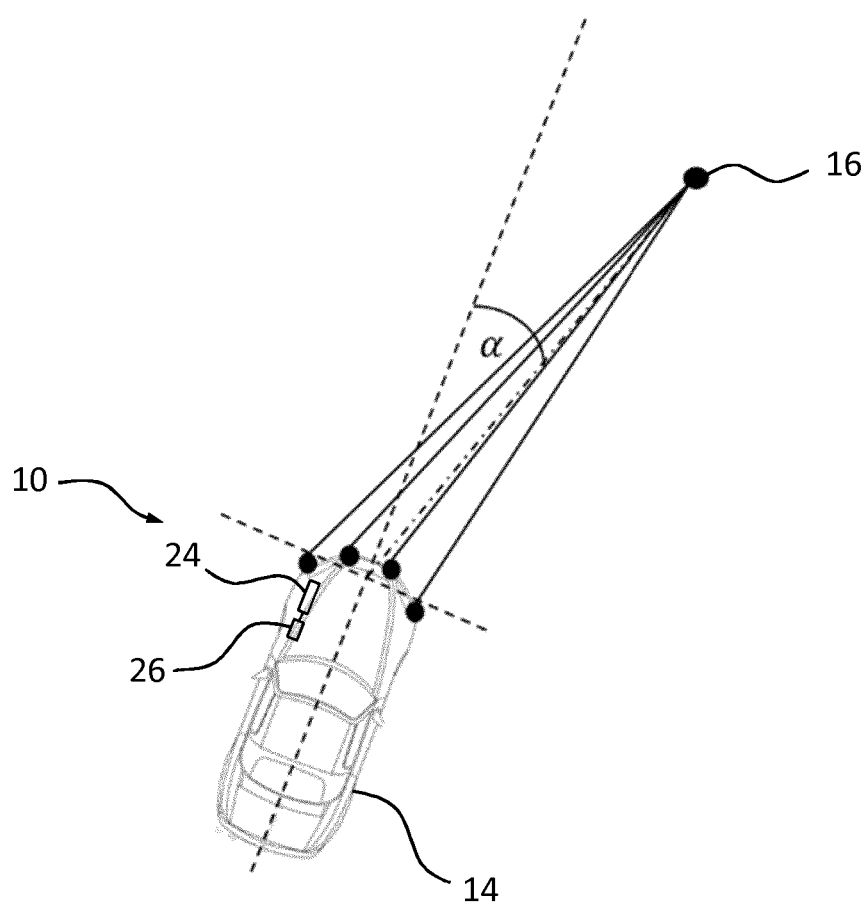
FIG. 1 illustrates a possible embodiment of the automotive spread radar system in accordance with the invention in a state of being installed in a vehicle, FIG. 2 schematically shows the plurality of transceiver antenna units of the automotive spread radar system pursuant to FIG. 1 and an example of contents of the plurality range gates of a transceiver antenna unit receiving a reference signal.

FIG. 1 shows a possible embodiment of an automotive spread radar system 10 in accordance with the invention. The automotive spread radar system 10 is configured for detecting reflecting targets 16 in its field of view, for unambiguously measuring a range to and a relative radial velocity of each of the detected targets 16, and for measuring an angle of arrival a of the reflected radar signal of each of the detected targets 16.

Means and methods to determine the above-mentioned quantities from radar signals received after having been reflected by a target 16 in the field of view of the radar system are well known in the art, for instance in the prior art cited herein, and shall therefore not be described in detail herein.

The automotive spread radar system 10 is installed in a vehicle 14 formed by a passenger car to provide information that is to be used as an input for a collision avoidance system of the vehicle 14. The automotive spread radar system 10 comprises a plurality of four transceiver antenna units $TRx_k$, k=1-4, that are arranged at a priori known positions at a front region of the vehicle 14.

Figure 2:
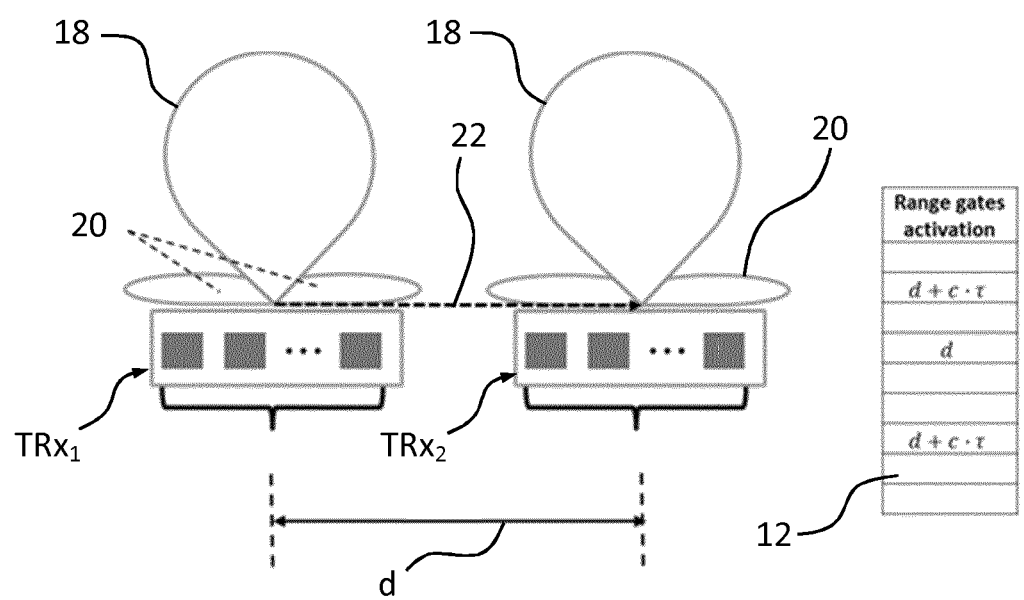
Figure 3:
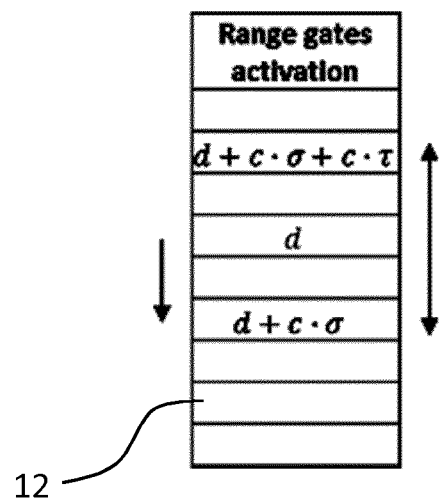
FIG. 3 shows another example of contents of the plurality range gates of a transceiver antenna unit receiving a reference signal.

FIG. 2 schematically illustrates two transceiver antenna units $TRx_1$, $TRx_2$ of the plurality of four transceiver antenna units $TRx_k$, k=1-4, of the automotive spread radar system 10 pursuant to FIG. 1. In FIG. 2, the transceiver antenna units $TRx_1$, $TRx_2$ are shown to be arranged at a priori known positions to form a one-dimensioned linear array, wherein the transceiver antenna units $TRx_k$ are evenly spaced by a distance d, which in this specific embodiment is 0.5 m. For reasons of simplicity of the considerations to follow, this arrangement differs from the arrangement shown in FIG. 1. However, those skilled in the art will appreciate that similar geometrical considerations apply.

In this specific embodiment, the transceiver antenna units $TRx_k$ are identically designed. Each transceiver antenna unit $TRx_k$ includes a plurality of n≥3 patches. In other embodiments, the number of patches may be different for some or for all of the transceiver antenna units $TRx_k$.

A carrier frequency f of the radar waves transmitted by the transceiver antenna units $TRx_k$ is about 80 GHz, meaning a wavelength $\lambda_c$ of 37.5 mm. Thus, the distance d between adjacent transceiver antenna units $TRx_k$, $TRx_k+1$ is substantially larger than the radar carrier wavelength $\lambda_c$, namely by a factor of more than 10.

The plurality of transceiver antenna units $TRx_k$ is configured to work in a multiple-input and multiple-output (MIMO) configuration. The individual transceiver antenna units $TRx_k$ transmit mutually orthogonal radar waves, i.e. each transceiver antenna unit $TRx_k$ can decode its own echo and the echoes generated by other transceiver antenna units $TRx_k$ without cross talk disturbances. To this end, the automotive spread radar system 10 comprises modulation means to operate the plurality of transceiver antenna units $TRx_k$ in a phase-modulated continuous wave (PMCW) mode.

Figure 4:
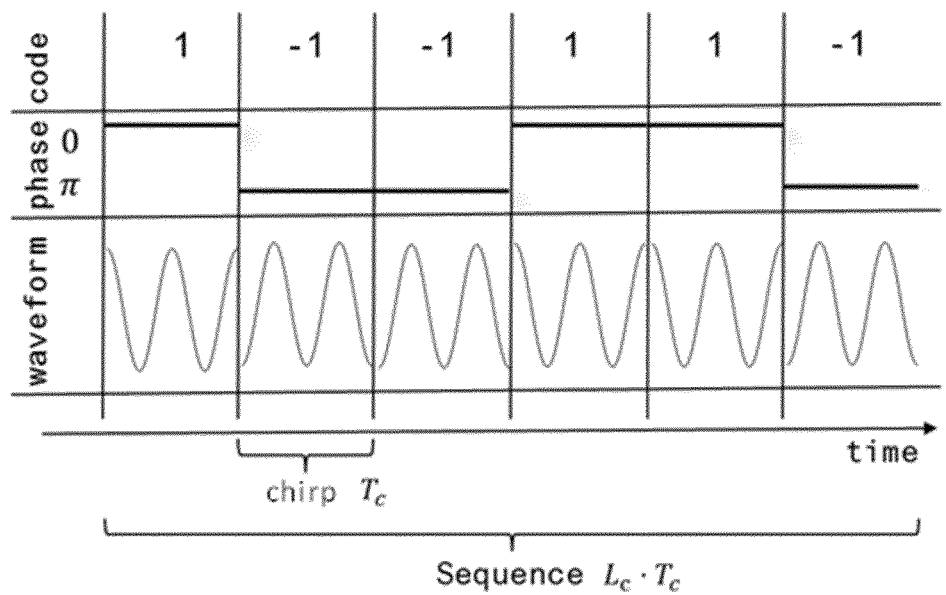
FIG. 4 shows a phase-modulated continuous wave for operating the transceiver antenna units pursuant to FIG. 2.

In this embodiment, PMCW is based on bi-phase modulation, which means $\varphi(t)=0°$ or $\varphi(t)=180°$ for an emitted signal $u(t)=A\cos(ft+\varphi(t))$. The phase code $c=(c_k)\in\{-1,1\}^{L_c}$, which is meant to be sent out could be properly chosen, for example as an Almost Perfect Auto-Correlation Sequence (APAS) or a Maximum Length-Sequence (m-sequence), depending on the requirements. The phase can then be modelled via $$\varphi_c(t) := \begin{cases} 0° \text{ if } c_{\frac{t}{T_c} \mod L_c} = 1 \\ 180° \text{ if } c_{\frac{t}{T_c} \mod L_c} = -1 \end{cases}$$

with chirp duration $T_C$ and code (sequence) length $L_c$. A potential embodiment of a phase-modulated radar waveform is illustrated in FIG. 4.

For the PMCW automotive spread radar system 10 the MIMO concept can be realized via Hadamard coding to provide orthogonal signals. This per se known technique (for instance from Bell, D. A.: "*Walsh functions and Hadamard matrixes*", Electronics letters 9.2 (1966), 340-341) is called *Outer Code MIMO Concept*. For that purpose a matrix can be taken from the Walsh-Hadamard family (exists for all lengths in multiples of 2, ranging from 4 to 664) in which all rows are orthogonal. The length of needed outer code is equal to the number of transceiver antenna units $TRx_k$. For this specific embodiment with four transceiver antenna units $TRx_k$, one Hadamard matrix is given by $$H = \begin{bmatrix} 1 & 1 & 1 & 1 \\ 1 & -1 & 1 & -1 \\ 1 & 1 & -1 & -1 \\ 1 & -1 & -1 & 1 \end{bmatrix}$$

Figure 5:
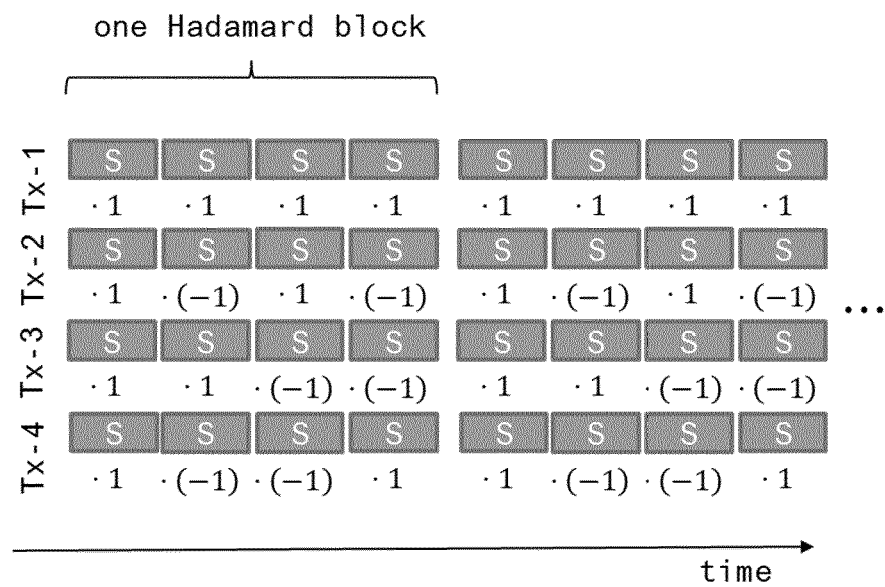
FIG. 5 shows a sequence to be transmitted by the transceiver antenna units, coded by a Hadamard matrix.

Then the sequence S, which is sent out will be coded (multiplied) by such Hadamard matrices as shown in FIG. 5.

Each transceiver antenna unit $TRx_k$ is configured to transmit and to receive radar waves. In FIG. 2, the main lobe 18 and two side lobes 20 are shown for the transceiver antenna units $TRx_1$, $TRx_2$.

In the following, an embodiment of a method of operating an automotive spread MIMO radar system 10 in accordance with the invention will be described.

Each transceiver antenna unit $TRx_k$ transmits a reference signal 22 that is synchronized with the transmitted radar waves. The reference signal 22 is formed by the radar waves transmitted by the side lobes 20 of the transmitting transceiver antenna unit $TRx_1$. In this way, a field of view provided by the main lobes 18 of the transceiver antenna units $TRx_k$ is not affected by any one of the other transceiver antenna units $TRx_j$, j≠k. The reference signal 22 of each transceiver antenna unit $TRx_k$ is directly received by another transceiver antenna unit $TRx_1$, j≠k of the plurality of transceiver antenna units. In FIG. 2, this is illustrated for transceiver antenna unit $TRx_1$ transmitting the reference signal 22 and transceiver antenna unit $TRx_2$ directly receiving the reference signal 22.

As shown in FIG. 2, for each specific transceiver antenna unit $TRx_k$ of the plurality of transceiver antenna units $TRx_k$, the automotive spread radar system 10 includes a plurality of range gates 12 that are configured to indicate a range of a target 16 detected by the specific transceiver antenna unit $TRx_k$. FIG. 2 illustrates the range gates 12 of transceiver antenna unit $TRx_2$.

The reference signal 22 transmitted by transceiver antenna unit $TRx_1$ comprising a sequence with outer Hadamard coding, is received by transceiver antenna unit $TRx_2$.

The received reference signal 22 is then decoded and correlated to determine a distance r between the transceiver antenna units $TRx_1$, $TRx_2$ by reading out the plurality of range gates 12 of transceiver antenna unit $TRx_2$. If the two transceiver antenna units $TRx_1$, $TRx_2$ were perfectly synchronized, the measured distance will correspond to the a priori known geometrical distance d, i.e. d=r.

If the transceiver antenna units $TRx_1$, $TRx_2$ have a (positive or negative) relative time delay r, the received reference signal 22 will be identified in a shifted range gate 12 corresponding to $r_\tau = d + c \cdot \tau$ (c: speed of light). If $r_\tau \geq 0$, the time delay identification is unique, because the reference signal 22 from the transmitting transceiver antenna unit $TRx_1$ is always in one of the first range gates 12 which is activated at the receiving transceiver antenna unit $TRx_2$ (each detour over a target will provide a larger time shift and will occur in a later range gate). The time delay r in this case can be calculated by $$\tau = \frac{r_\tau - d}{c}$$

For illustration purposes, the following scenario is considered. A PMCW radar sequence is sent from transceiver antenna unit $TRx_1$ with a chirp duration $T_c = 0.5$ ns, and is received at transceiver antenna unit $TRx_2$ with the a priori known distance of d=0.5 m. The range resolution $R_{res}$ of such configuration is given by $$R_{res} = \frac{cT_c}{2} \approx 0.075 \text{ m.}$$

At perfect synchronization, the reference signal 22 takes $$\frac{d}{c} \approx 1.67 \text{ ns}$$

to reach transceiver antenna unit $TRx_2$ from transceiver antenna unit $TRx_1$ This means a time delay $\tau \geq -1.67$ ns can be corrected, which corresponds to $$\frac{d}{cT_c} = \frac{d}{2R_{res}} = 3$$

range gates. In a next step, based on the read-out range gate 12 of the plurality of range gates that indicates the received reference signal 22 and the a priori known distance d, the transceiver antenna unit $TRx_1$ and the transceiver antenna unit $TRx_2$ that received the reference signal 22 are synchronized. The larger the distance d and the finer the range resolution $R_{res}$, the larger the range of unambiguity.

If transceiver antenna unit $TRx_1$ sends the reference signal 22 too early, i.e.

$$\tau < -\frac{d}{c},$$

the activated range gate 12 at transceiver antenna unit $TRx_2$ will jump to the end of the list of range gates. As a result the reference signal 22 will appear as a faraway target, and the reference signal 22 could no longer be identified via the described first-in uniqueness.

The range of unambiguity arising from the transmitted reference signal 22 being sent out too early to be detected in one of the first range gates 12 of the receiving transceiver antenna unit $TRx_2$ is avoided for a larger range of time, and the time synchronization is made more robust by a step in which the transceiver antenna unit $TRx_1$ transmits the reference signal 22 with a predetermined time delay $\sigma$ relative to the transmitted radar wave. In this way, the transmitting transceiver antenna unit $TRx_1$ acts as a master transceiver antenna unit and the receiving transceiver antenna unit $TRx_2$ acts as a slave transceiver antenna unit. The predetermined time delay $\sigma$ is larger than zero, and namely is $\sigma = 10$ ns.

In the case of perfect synchronization between the transceiver antenna units $TRx_1$ and $TRx_2$, the reference signal 22 is then received by the slave transceiver antenna unit $TRx_2$ in the range gate corresponding to $\tilde{r}_0 = d + c \cdot \sigma$. In case of a non-zero relative time delay $\tau$, the received signal will be located in the range gate 12 corresponding to $$\tilde{r}_\tau = d + c \cdot \sigma + c \cdot \tau$$

This means that the range of uniqueness has shifted to $\tilde{r}_\tau \geq 0$, which in turn means that a relative time shift $\tau$ can be unambiguously detected if $$\tau \leq \frac{\tilde{r}_\tau - d - c \cdot \sigma}{c}.$$

The predetermined time delay $\sigma$ of the master transceiver antenna unit $TRx_1$ leads to a reduction of the range of unambiguity from master transceiver antenna unit $TRx_1$ to slave transceiver antenna unit $TRx_2$ of $$\tilde{R}_{max} = \frac{c \cdot \left(L_c - \frac{\sigma}{T_c}\right)}{2R_c},$$

wherein $L_c$ denotes the sequence length, $T_c$ the chirp duration and $R_c$ the chirp rate. It is noted that this reduction only affects the cross talk of the receiving transceiver antenna units. The delay will not lead to a reduction of the master transceiver antenna unit $TRx_1$.

It follows that the predetermined time delay $\sigma$ of the master transceiver antenna unit $TRx_1$ of 10 ns results in a unique correction time delay of $\tau \geq -11.67$ ns, corresponding to 23 range gates. The predetermined time delay $\sigma$ leads to an additional loss in the range of unambiguity from master transceiver antenna unit $TRx_1$ to slave transceiver antenna unit $TRx_2$ with range of unambiguity of $R_{max} = 75$ m:

$$\tilde{R}_{max} = \frac{c \cdot \left(L_c - \frac{\sigma}{T_c}\right)}{2R_c} = 73.5 \text{ m}$$

i.e. a loss in the range of unambiguity of $\Delta R_\sigma = 1.5$ m ($L_c = 1000$ and $$R_c = \frac{1}{T_c} = 2 \text{ GHz}).$$

As a result, the distance of unambiguity is reduced to 36.75 m.

In another step of the method, the carrier frequency f of the master transceiver antenna unit $TRx_1$ is determined from the signal of the slave transceiver antenna unit $TRx_2$ that is generated upon receiving the reference signal 22.

The method relies on the insight that a difference in the radar carrier frequencies results in a measurable Doppler shift. Without loss of generality, the local oscillator at transceiver antenna unit $TRx_1$ has radar carrier frequency f and the local oscillator of transceiver antenna unit $TRx_2$ has radar carrier frequency $f+f_\varepsilon$, wherein $f_\varepsilon \ll f$.

From the reference signal 22 received by transceiver antenna unit $TRx_2$ the transceiver antenna unit $TRx_1$ appears to have a Doppler shift $f_D$, which differs from an expected Doppler shift $f_{exp}$, which in case of the vehicle 14 driving straight ahead is zero. With the method steps described above the direct path reference signal 22 transmitted by transceiver antenna unit $TRx_1$ can uniquely be identified.

For example, the Doppler frequency resolution of the PMCW radar system 10 is given by $$f_{res} = \frac{1}{2T_d},$$

where $T_d = T_c \cdot L_c \cdot M \cdot N$ is the dwell time, M is a number of accumulations and N is a number of FFT points to extract the Doppler information, as is per se known in the art. The range $f_{max}$ of maximum unambiguity Doppler frequency can be computed as $$f_{max} = \frac{N}{2} f_{res} = \frac{N}{4T_d} = \frac{1}{4} \frac{1}{T_c L_c M}.$$

This shows that the number of FFT points has no influence on the range $f_{max}$ of the maximum unambiguity Doppler frequency, and the smaller the chirp duration $T_c$, sequence length $L_c$ or the number of accumulations M, the larger the frequency shift which can be detected.

With the local oscillator (carrier) frequency f of transceiver antenna unit $TRx_1$ of f=80 GHz and the local oscillator (carrier) frequency f' of transceiver antenna unit $TRx_2$ of frequency $f+f_\varepsilon$, the Doppler frequency resolution is $$f_{res} = \frac{1}{2T_d} = 52.0833 \text{ Hz}$$

wherein $T_d = T_c \cdot L_c \cdot M \cdot N = 9.6$ ms is the dwell time for M=150, N=128, $T_c = 0.5$ ns and the sequence length $L_c = 1000$. The range of the maximum unambiguity Doppler frequency which could be resolved and corrected for is $$f_{max} = \frac{N}{2} f_{res} = \frac{N}{4T_d} = \frac{1}{4} \frac{1}{T_c L_c M} = 3.33 \text{ kHz}.$$

With reference to FIG. 1, the automotive spread radar system 10 comprises an evaluation and control unit 24 that is configured for reading out the plurality of range gates 12 for all transceiver antenna units $TRx_k$ that received a reference signal 22, and for synchronizing the transceiver antenna unit $TRx_k$, which sent out the reference signal 22, and the transceiver antenna unit $TRx_j$, j≠k, that received the reference signal 22, based on the read-out range gate 12 of the plurality of range gates that indicates the received reference signal 22, and based on the a priori known distance d between the reference signal-transmitting transceiver antenna unit $TRx_k$ and the reference signal-receiving transceiver antenna unit $TRx_j$, j≠k.

The evaluation and control unit 24 can be located at any place within the vehicle 14 that appears suitable to those skilled in the art.

In order to be able to execute the disclosed steps, the evaluation and control unit 24 is equipped with a processor unit and a digital data memory unit to which the processor unit has data access, and a signal processing unit 26 (FIG. 6) whose function will be described later on. The evaluation and control unit 24 is furnished with a software module for controlling automatic execution of steps of the method.

Method steps to be conducted are converted into a program code of the software module. The program code is implemented in the digital data memory unit of the evaluation and control unit and is executable by the processor unit of the evaluation and control unit.

Signals received by the transceiver antenna units $TRx_k$ are processed by the signal processing unit 26 that forms part of the automotive spread radar system 10. The signal processing unit 26 is known per se and described herein for the sake of completeness.

Figure 6:
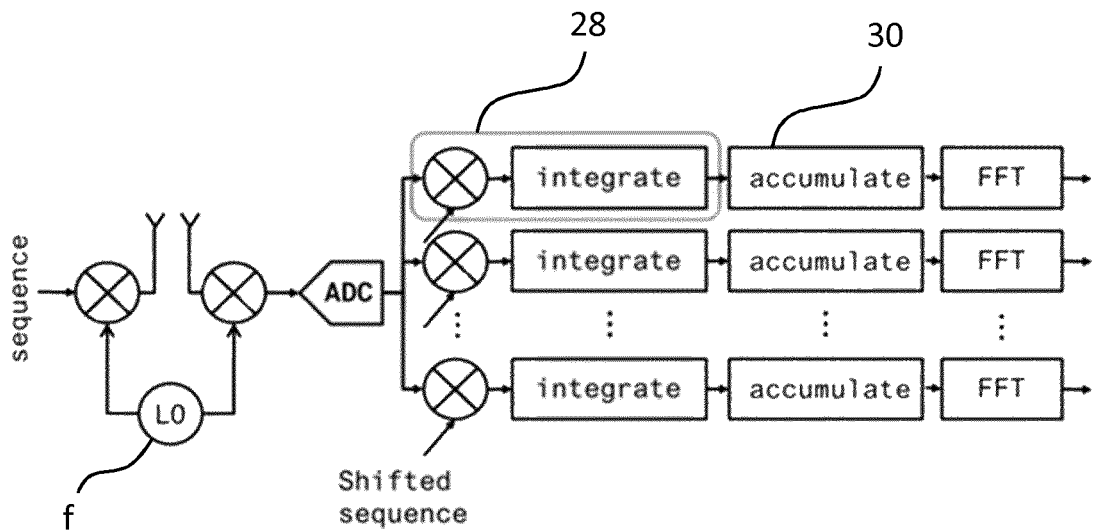
FIG. 6 is a schematic layout of a signal processing unit of the automotive spread radar system.

The layout of the signal processing unit 26 is illustrated in FIG. 6. Correlators 28 will perform ranging, similar as known from global positioning systems (GPS). The number of parallel correlators 28 is equal to the sequence length $L_e$ to provide the range processing in one step. The coherent accumulator 30 will increase the signal-to-noise ratio (SNR) via M accumulations, and at least a Fast Fourier Transform (FFT) to extract the Doppler information will be performed.

Figure 7:
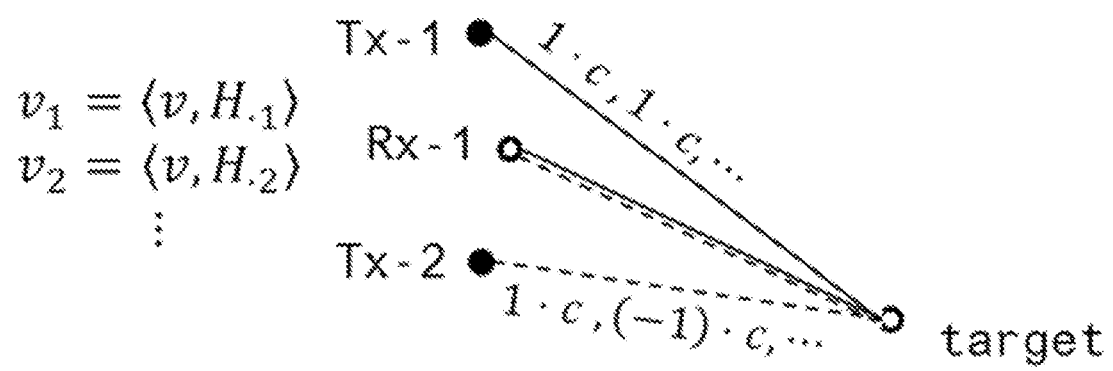
FIG. 7 is a schematic depicting a receiver that receives transmissions reflected off a target from a plurality of transmitters.

At the receiver side a multiplication of a signal v with each row of the Hadamard matrix $H_{\cdot i}$ is necessary to distinguish between each transmitter (after correlation, see FIG. 7).

While the invention has been illustrated and described in detail in the drawings and foregoing description, such illustration and description are to be considered illustrative or exemplary and not restrictive; the invention is not limited to the disclosed embodiments.

Other variations to be disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality, which is meant to express a quantity of at least two. The mere fact that certain measures are recited in mutually different dependent claims does not indicate that a combination of these measures cannot be used to advantage. Any reference signs in the claims should not be construed as limiting scope.

The invention claimed is:

1. An automotive spread multiple-input multiple-output configured radar system, comprising:
   a plurality of transceiver antenna units that are configured to transmit mutually orthogonal radar waves,
   for each transceiver antenna unit of the plurality of transceiver antenna units, a plurality of range gates that are configured to indicate a range detected by the transceiver antenna unit, wherein at least one specific transceiver antenna unit (TRx1) of the plurality of transceiver antenna units is configured to transmit, synchronized with the radar waves, a reference signal that is to be received directly by at least one transceiver antenna unit (TRx2) that is separated by an a priori known distance from the specific transceiver antenna unit (TRx1), and wherein the distance is substantially larger than a radar carrier wavelength, an evaluation and control unit that is configured to:
  read out the plurality of range gates for the transceiver antenna unit (TRx2) that received the reference signal,
  based on the read-out range gate of the plurality of range gates that indicates the received reference signal and based on the a priori known distance, synchronize the specific transceiver antenna unit (TRx1) and the transceiver antenna unit (TRx2) that received the reference signal.

2. The automotive spread radar system as claimed in claim 1, wherein the at least one specific transceiver antenna unit (TRx1) of the plurality of transceiver antenna units is configured to transmit the reference signal with a predetermined time delay relative to the transmitted radar wave, wherein the predetermined time delay is larger than zero.

3. The automotive spread radar system as claimed in claim 1, further comprising means for determining a carrier frequency of the specific transceiver antenna unit (TRx1) from a signal of the transceiver antenna unit (TRx2) that received the reference signal, wherein the evaluation and control unit is configured to correct, based on the determined carrier frequency, a Doppler shift measured at a target by the specific transceiver antenna unit (TRx1).

4. The automotive spread radar system as claimed in claim 1, wherein the transceiver antenna units of the plurality of transceiver antenna units are located at a priori known positions at the surrounding of a vehicle.

5. The automotive spread radar system as claimed in claim 1, wherein the evaluation and control unit comprises a processor unit and a digital data memory unit to which the processor unit has data access.

6. The automotive spread radar system as claimed in claim 1, further comprising modulation means to operate the plurality of transceiver antenna units in a phase-modulated continuous wave mode.

7. A method of operating an automotive spread multiple-input multiple-output configured radar system comprising a plurality of transceiver antenna units that are configured to transmit mutually orthogonal radar signals, and for each transceiver antenna unit of the plurality of transceiver antenna units a plurality of range gates for indicating a range detected by the transceiver antenna unit, the method comprising steps of:

transmitting modulated, mutually orthogonal radar waves by the plurality of transceiver antenna units in a continuous-wave manner, by at least one specific transceiver antenna unit (TRx1) of the plurality of transceiver antenna units, directly transmitting a reference signal that is synchronized with the radar wave transmitted by the at least one specific transceiver antenna unit (TRx1), to at least one transceiver antenna unit (TRx2) that is separated by an a priori known distance from the specific transceiver antenna unit (TRx1), reading out the plurality of range gates for the at least one transceiver antenna unit (TRx2) that received the reference signal, and based on the read-out range gate of the plurality of range gates that indicates the received reference signal and the a priori known distance, synchronizing the specific transceiver antenna unit (TRx1) and the transceiver antenna unit (TRx2) that received the reference signal.

8. The method as claimed in claim 7, wherein the step of directly transmitting a reference signal that is synchronized with the radar wave comprises transmitting the reference signal with a predetermined time delay relative to the transmitted radar wave, wherein the predetermined time delay is larger than zero.

9. The method as claimed in claim 7, further comprising steps of:

determining a carrier frequency of the specific transceiver antenna unit (TRx1) from a signal of the transceiver antenna unit (TRx2) that received the reference signal, and based on the determined carrier frequency, correcting a Doppler shift measured at a target by the specific transceiver antenna unit (TRx1).

10. The method as claimed in claim 7, wherein the steps are repeated for pairs of transceiver antenna units (TRx$_1$, TRx$_2$) out of the plurality of transceiver antenna units such that each transceiver antenna unit has directly transmitted a reference signal to at least one other transceiver antenna unit and has directly received a reference signal from at least one other transceiver antenna unit.

11. A non-transitory computer-readable medium for controlling automatic execution of steps of the method as claimed in claim 7, wherein the method steps are stored on the computer-readable medium as a program code, wherein the computer-readable medium comprises a part of the automotive spread radar system or a separate control unit and the program code is executable by a processor unit of the automotive spread radar system or a separate control unit.

* * * * *